(12) United States Patent
Ito et al.

(10) Patent No.: US 6,988,878 B2
(45) Date of Patent: Jan. 24, 2006

(54) APPARATUS AND METHOD FOR MOLDING ARTICLES

(75) Inventors: Takayuki Ito, Aichi-ken (JP); Katsumi Takahashi, Aichi-ken (JP); Toshihiko Asaya, Aichi-ken (JP)

(73) Assignee: Toyoda Gosei Co., Ltd., Aichi-ken (JP)

( * ) Notice: Subject to any disclaimer, the term of this patent is extended or adjusted under 35 U.S.C. 154(b) by 219 days.

(21) Appl. No.: 10/242,698

(22) Filed: Sep. 13, 2002

(65) Prior Publication Data

US 2003/0047830 A1 Mar. 13, 2003

(30) Foreign Application Priority Data

Sep. 13, 2001 (JP) .............................. 2001-278818

(51) Int. Cl.
*B29C 44/06* (2006.01)
*B29C 44/12* (2006.01)
*B29C 44/60* (2006.01)

(52) U.S. Cl. ............. 425/4 R; 425/116; 425/129.1; 425/130; 425/546; 425/812; 425/817 R

(58) Field of Classification Search ............ 425/4 R, 425/116, 129.1, 130, 812, 817 R, 149, 546
See application file for complete search history.

(56) References Cited

U.S. PATENT DOCUMENTS

| | | | | |
|---|---|---|---|---|
| 3,704,081 A | * | 11/1972 | Immel | 425/4 R |
| 3,970,732 A | * | 7/1976 | Slaats et al. | 264/40.5 |
| 4,208,368 A | * | 6/1980 | Egli | 264/45.5 |
| 5,110,085 A | * | 5/1992 | Iwasawa | 251/29 |
| 5,589,202 A | * | 12/1996 | Okano et al. | 425/73 |
| 5,633,289 A | * | 5/1997 | Nakamura et al. | 521/51 |
| 5,962,142 A | * | 10/1999 | Tachi et al. | 428/423.1 |
| 6,156,257 A | * | 12/2000 | Tachi et al. | 264/510 |
| 6,241,928 B1 | * | 6/2001 | Hatsuda et al. | 264/216 |
| 6,607,681 B1 | * | 8/2003 | Ito et al. | 264/46.4 |

FOREIGN PATENT DOCUMENTS

| | | | |
|---|---|---|---|
| EP | 1088648 A1 | * | 4/2001 |
| JP | A-1-146914 | | 10/1989 |
| JP | A-4-008523 | | 1/1992 |
| JP | A-5-031563 | | 2/1993 |
| JP | A-6-008288 | | 1/1994 |
| JP | A-7-186191 | | 7/1995 |
| JP | A-11-156859 | | 6/1999 |
| JP | A-2000-280286 | | 10/2000 |
| JP | A-2001-096546 | | 4/2001 |

* cited by examiner

*Primary Examiner*—Robert B. Davis
(74) *Attorney, Agent, or Firm*—Posz Law Group, PLC

(57) ABSTRACT

A first injection mechanism of an apparatus for molding articles injects coating material into a cavity defined in a clamped mold, thereby forming a predetermined coating on the inner surface of the cavity. After the coating material is injected into the cavity, a decompression mechanism lowers the pressure in the cavity through at least one vent. After the coating is formed on the inner surface of the cavity, a second injection mechanism injects molding material into the cavity. When the pressure in the cavity is being lowered, an opening-closing mechanism opens the vent. Before or during the injection of the molding material, the opening-closing mechanism closes the vent.

9 Claims, 9 Drawing Sheets

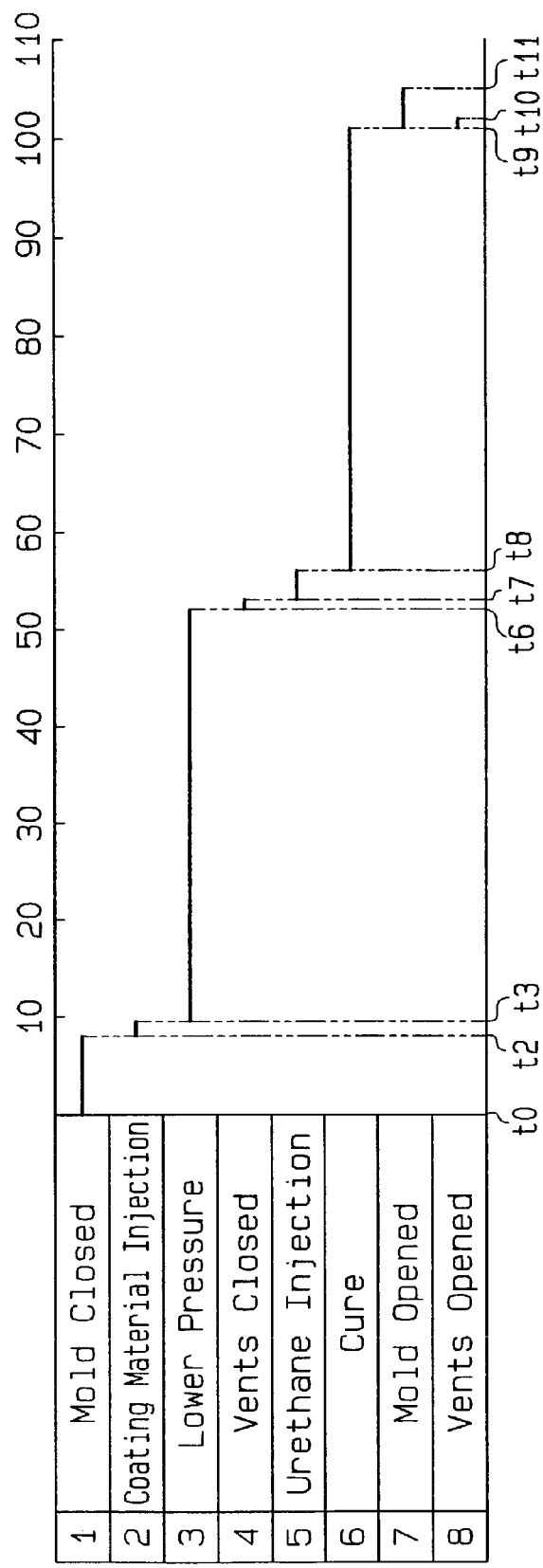

APPARATUS AND METHOD FOR MOLDING ARTICLES

BACKGROUND OF THE INVENTION

The present invention relates to an apparatus and a method for molding articles.

Typical vehicle steering wheels are formed by molding. When molding a steering wheel, a core is arranged at a predetermined position in the cavity of a mold. The cavity is then filled with molding material. A reaction of the molding material occurs in the mold and the material is cured. The molding material for steering wheels typically contains polyurethane (PUR) as a foaming agent. However, some polyurethane used as a foaming agent for steering wheels has poor light resistance and yellows with time. Therefore, when using polyurethane for molding an article, the surface of polyurethane portion of the molded article is coated with surface protection having light resistance, or a mold coating agent, to form a mold coating agent layer.

Such a mold coating agent layer is formed, for example, in the following manner.

Preparation of the molding is usually performed in one of the two following methods. According to one of the methods, a solution containing mold coating agent and a solvent, or a coating material, is poured into the recesses of a mold when the mold is open. Then, the core is arranged to correspond to a cavity, which is defined by the recesses when the mold is clamped. According to the other method, the core is first arranged to correspond to the cavity. Then, coating material is poured in to the cavity after the mold is clamped.

In either method, after the coating material and the core are arranged in the mold, air in the cavity is discharged through a discharging hole, which communicates the cavity with the exterior of the mold. Accordingly, the interior of the cavity becomes vacuum. The vacuum causes the solvent in the coating material to boil. As the solvent boils, foams are created and broken, which scatters the mold coating agent. This applies the mold coating agent to the inner wall of the cavity. The applied agent is then dried. Thereafter, the cavity is filled with the molding material to form a urethane article.

However, according to the prior art method, some of the molding material flows from the cavity to the exterior of the mold through the discharging hole. The flowing out molding material is hardened and creates scrap. Also, when molding a urethane article, the amount of molding material poured into the cavity needs to be increased to factor in the outflow of the molding material through the discharging hole. Accordingly, the cost of the molded articles is increased.

When the pressure in the cavity is lowered, some of the coating material, which has been poured into the cavity, is discharged through the discharging hole. Therefore, the amount of the coating material poured into the cavity needs to be determined by factoring in the amount of the coating material that is discharged when the cavity pressure is lowered. This increases the cost of the coating material and thus increases the costs of the molded article.

To prevent the molding material and the coating material from flowing out of the mold, the size of the discharging holes may be reduced. However, if the size of the holes is extremely reduced, polyurethane in the molding material and the mold coating agent in the coating material will be hardened in the holes and blocks the holes. If the discharging holes are blocked, the scattering of the mold coating agent and the sublimation of the solvent in the coating material are hindered. Thus, the mold coating agent cannot be sufficiently dried. Also, the mold coating agent cannot be applied evenly.

SUMMARY OF THE INVENTION

The present invention was made for solving the above problems in the prior art. Accordingly, it is an objectives of the present invention to provide an apparatus and a method for molding articles that prevent molding material and coating material from flowing out of a mold, reduce the amount of required molding material and coating material, and form an even coating.

To achieve the foregoing and other objectives and in accordance with the purpose of the present invention, an apparatus for molding an article is provided. The apparatus includes a mold, an injection mechanism, a decompression mechanism, and an opening-closing mechanism. When the mold is clamped, a cavity is defined in the mold. The mold has at least one vent communicated with the cavity. The injecting mechanism injects coating material and molding material into the cavity. After the coating material is injected into the cavity, the decompression mechanism lowers the pressure in the cavity through the vent, thereby forming a predetermined coating on the inner surface of the cavity. The opening-closing mechanism opens and closes the opening of the vent.

The present invention may also be applied to a method for molding an article. The method includes steps of: injecting coating material into a cavity defined in a clamped mold, thereby forming a predetermined coating on the inner surface of the cavity; lowering the pressure in the cavity through at least one vent after the coating material is injected into the cavity; injecting molding material into the cavity after the coating is formed on the inner surface of the cavity; and closing the vent with an opening-closing mechanism before or during the injection of the molding material.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which:

FIG. 9 is a timing chart showing the molding method according to a comparison example.

DETAILED DESCRIPTION OF THE PREFERRED EMBODIMENTS

A molding apparatus and a molding method according to one embodiment of the present invention will now be described with reference to FIGS. 1 to 7. The apparatus and the method are used for molding an article, which is a vehicle steering wheel 10 in this embodiment.

Figure 1:
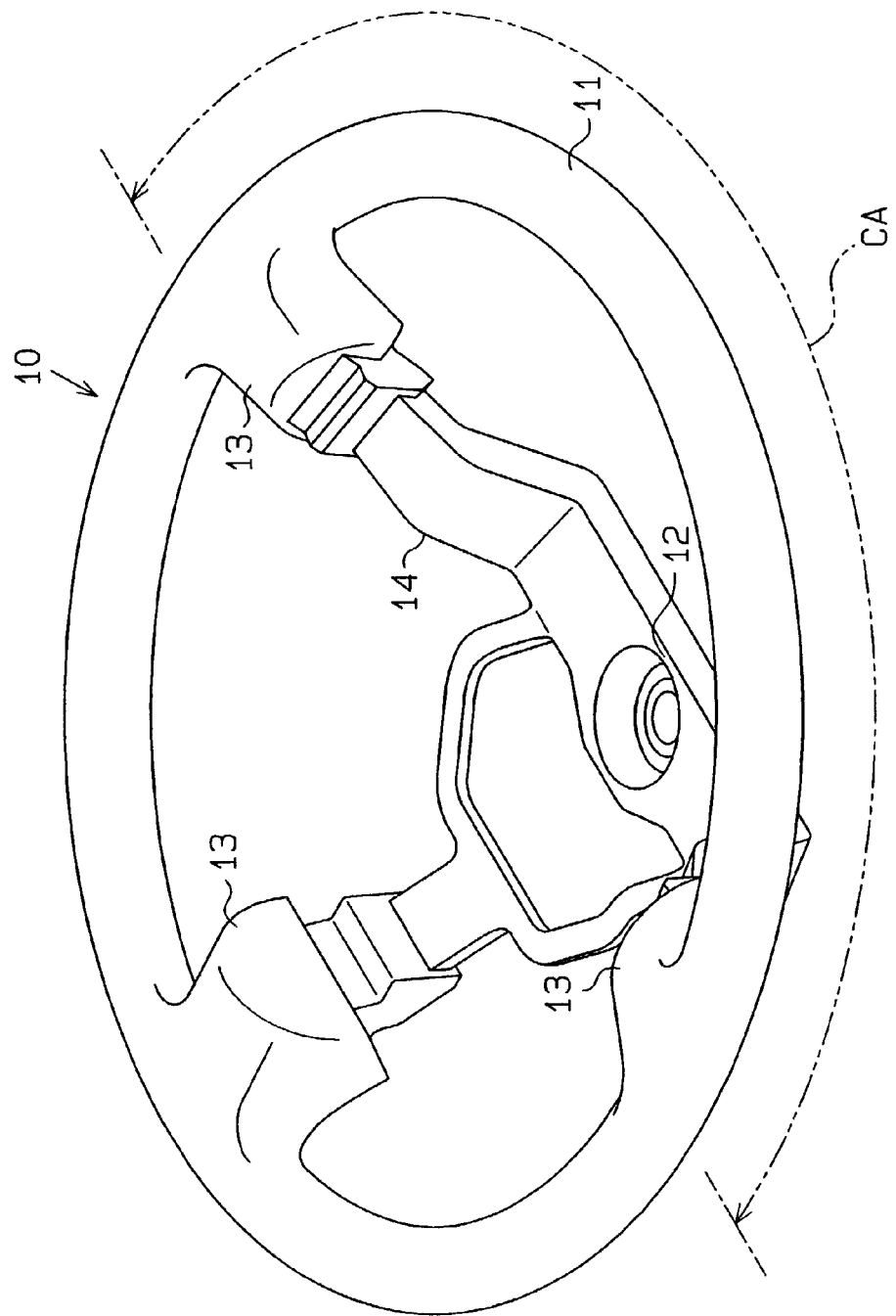
FIG. 1 is a perspective view illustrating a steering wheel according to one embodiment of the present invention.

As shown in FIG. 1, the steering wheel 10 includes a gripping ring 11, a boss 12, and spokes 13 for coupling the gripping ring 11 to the boss 12. In this embodiment, the number of the spokes 13 is three. The steering wheel 10 has a core 14. Part of the core 14 that corresponds to the gripping ring 11 and the spokes 13 is coated with polyurethane (PUR). The polyurethane forms a base layer. A light-resistant coating layer is formed on the base layer to protect the surface of the base layer. The molding apparatus is used for forming the base layer and the coating layer on the core 14 of the steering wheel 10.

The apparatus for molding the steering wheel 10 will now be described with reference to FIGS. 2 to 4.

Figure 2:
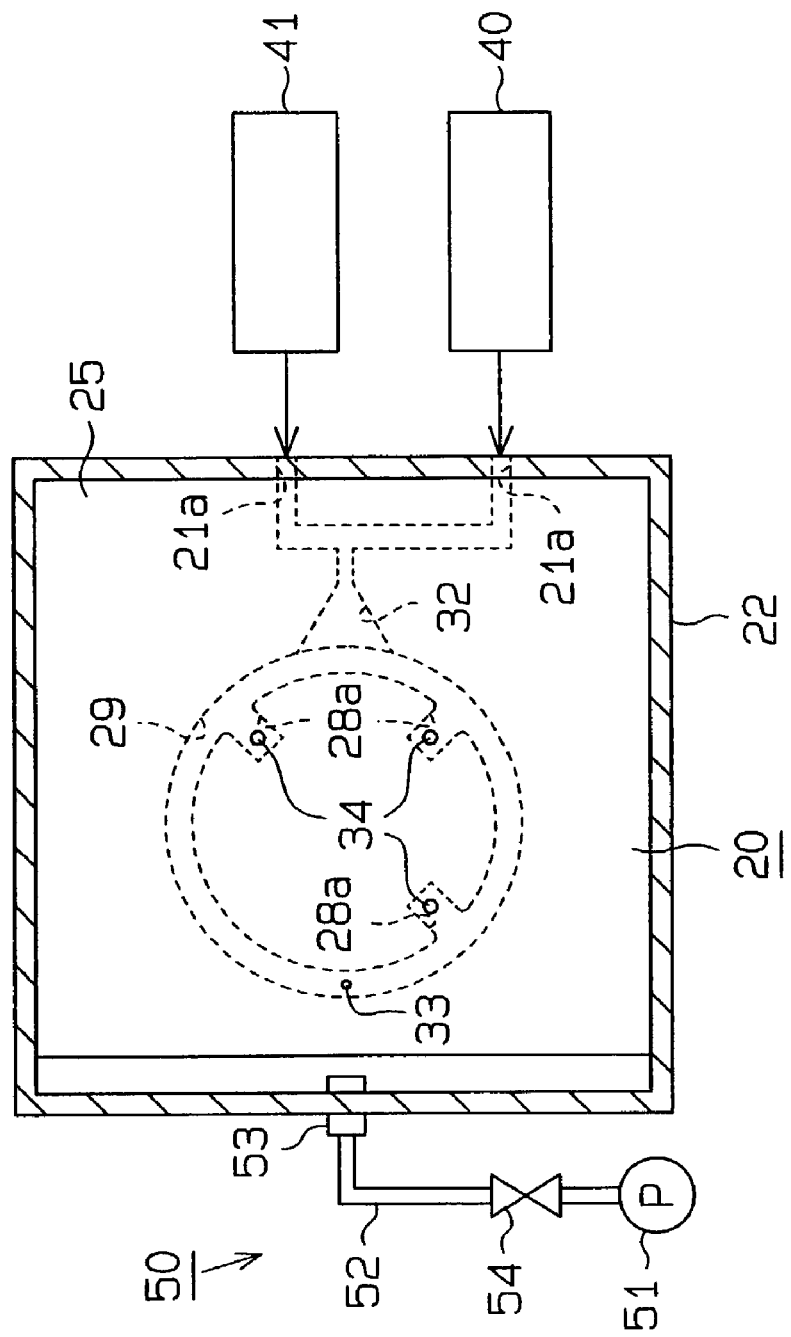
FIG. 2 is a schematic view showing a molding apparatus.

As shown in FIG. 2, the apparatus includes a mold 20, a first injector 40 for injecting coating material, a second injector 41 for injecting molding material, and a decompression mechanism 50.

The first injector 40 injects the coating material for forming the coating layer into the mold 20. The coating material contains solid matter, colorant, and solvent. In this embodiment, the solid matter includes mold coating agent (for example, light-resistant polyurethane) and colorant, and the solvent includes methyl ethyl ketone (MEK) and isopropyl alcohol (IPA).

The second injector 41 injects the molding material containing polyurethane into the mold 20. The molding material forms the base layer. The molding material includes polyol component and isocyanate component, which react to form polyurethane. The polyol component and the isocyanate component also function as foaming agents and foaming coadjuvants.

Figure 3:
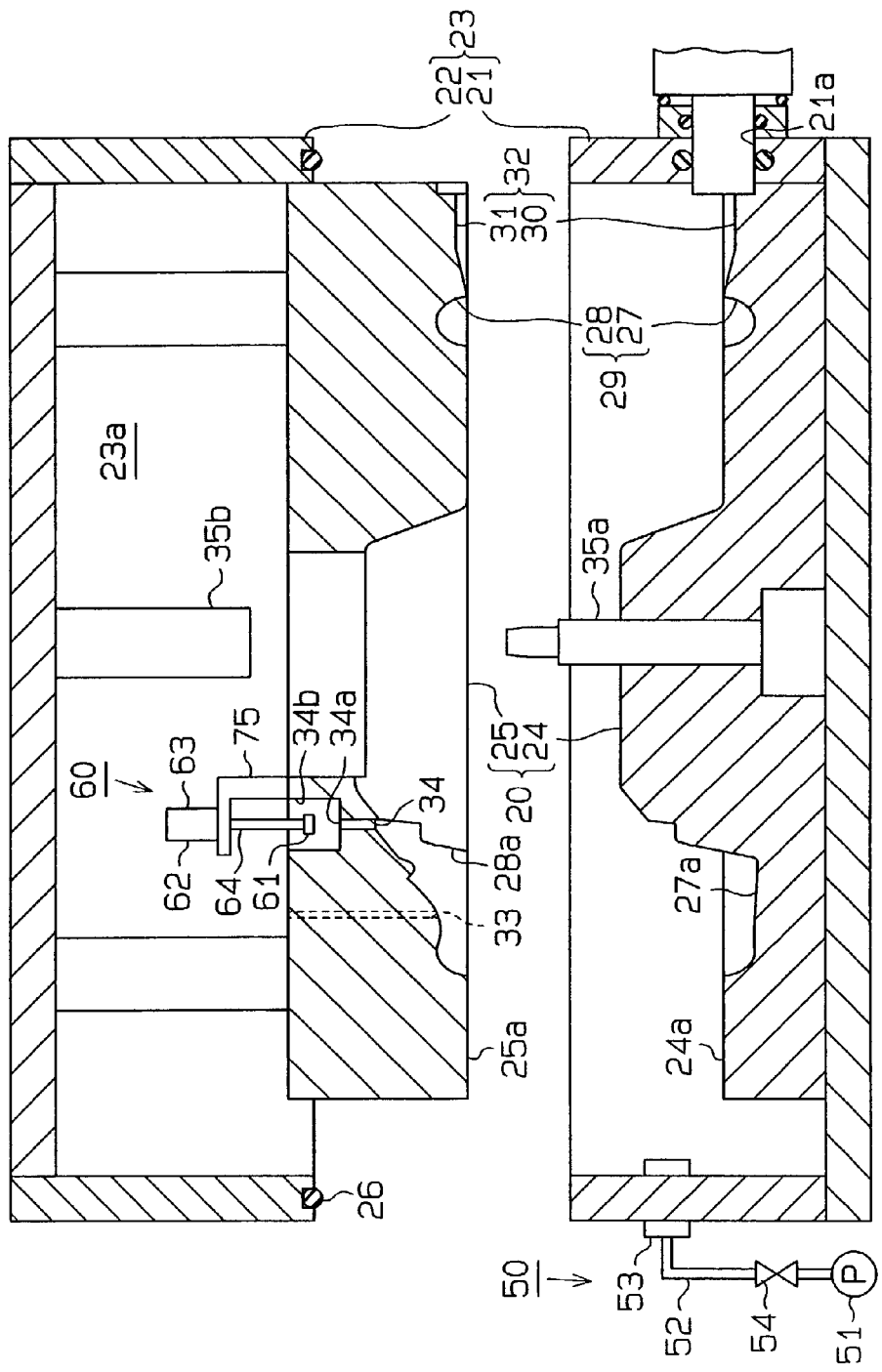
FIG. 3 is a cross-sectional view illustrating a box and mold of the molding apparatus.

As shown in FIGS. 2 and 3, the mold 20 is arranged in a box 23. The box 23 includes a frame body 21 and a lid body 22. The mold 20 includes a stationary die 24 and a movable die 25. The stationary die 24 is fixed in the frame body 21. The movable die 25 is fixed to the lid body 22. A seal member 26 is arranged at a part of the lid body 22 that contacts the frame body 21.

When the lower end surface of the lid body 22 is separated from the upper end surface of the frame body 21, the parting surface of the movable die 25 is separated from the parting surface of the stationary die 24, which opens the mold 20. When the lower end surface of the lid body 22 contacts the upper end surface of the frame body 21, the parting surface of the movable die 25 contacts the parting surface of the stationary die 24, which clamps the mold 20. When the mold 20 is closed, the space 23a in the box 23 is tightly sealed by the frame body 21, the lid body 22, and the seal member 26.

An annular groove 27 is formed in the parting surface of the stationary die 24. An annular groove 28 is formed in the parting surface of the movable die 25 at a position corresponding to the groove 27. The grooves 27, 28 each include three radial portions 27a, 28a, which extend inward. Each radial portion 27a corresponds to one of the radial portions 28a. Each pair of the radial portions 27a, 28a corresponds to one of the spokes 13. When the mold 20 is clamped, the grooves 27, 28 define a cavity 29 for molding the steering wheel 10.

An injection groove 30 is formed in the parting surface 24a of the stationary die 24. The injection groove 30 extends outward from the groove 27 is forked into two branches at one point. An injection groove 31 is formed in the parting surface 25a of the movable die 25. The injection groove 31 is forked into two branches at one point. The groove 31 corresponds to the groove 30. When the mold 20 is clamped, the injection grooves 30, 31 define a gate 32. The cavity 29 and the exterior of the box 23 are communicated by the gate 32 and two openings 21a formed in the frame body 21.

A small through hole 33 is formed in the movable die 25 to communicate the outer surface and the inner bottom surface of the movable die 25. The through hole 33 is located at the farthest position from the gate 32. When the molding material is injected into the cavity 29 while the mold 20 is clamped, the through hole 33 permits gas to escape from the cavity 29 to the exterior of the mold 20. When the mold 20 is closed, the cavity 29 is always communicated with the space 23a in the box 23 by the through hole 33.

A fixing member 35a extends upward from the frame body 21 through the center of the groove 27. Also, a fixing member 35b extends downward from the lid body 22 to correspond to the fixing member 35a. When the mold 20 is clamped for molding the steering wheel 10, the fixing members 35a, 35b fix the core 14 at the predetermined position.

When the steering wheel 10 is molded, the decompression mechanism 50 lowers the pressure in the space 23a in the box 23 and the cavity 29 of the mold 20. The decompression mechanism 50 includes a vacuum pump 51. The vacuum pump 51 is connected to the frame body 21 through a pipe 52 and a discharge pipe 53. A valve 54 is located in the pipe 52.

As shown in FIGS. 2 and 3, three vents 34 are formed in the movable die 25. The vents 34 open to the bottom of the groove 28 and to the outer surface of the movable die 25. Each vent 34 is located at a position in the groove 28 that corresponds to one of the spokes 13. The vents 34 permit the mold coating agent in the coating material to be effectively applied on the inner wall of the cavity 29. The vents 34 also permit the applied mold coating agent to be effectively dried. The vents 34 are separately formed from the through hole 33.

A recess 34b is formed at the outer opening 34a of each vent 34. The recesses 34b shorten the vents 34.

As shown in FIG. 3, an opening-closing mechanism 60 is provided at each vent 34 to open and close the opening 34a. Only one of the three opening-closing mechanism 60 is described in FIG. 3.

Figure 4:
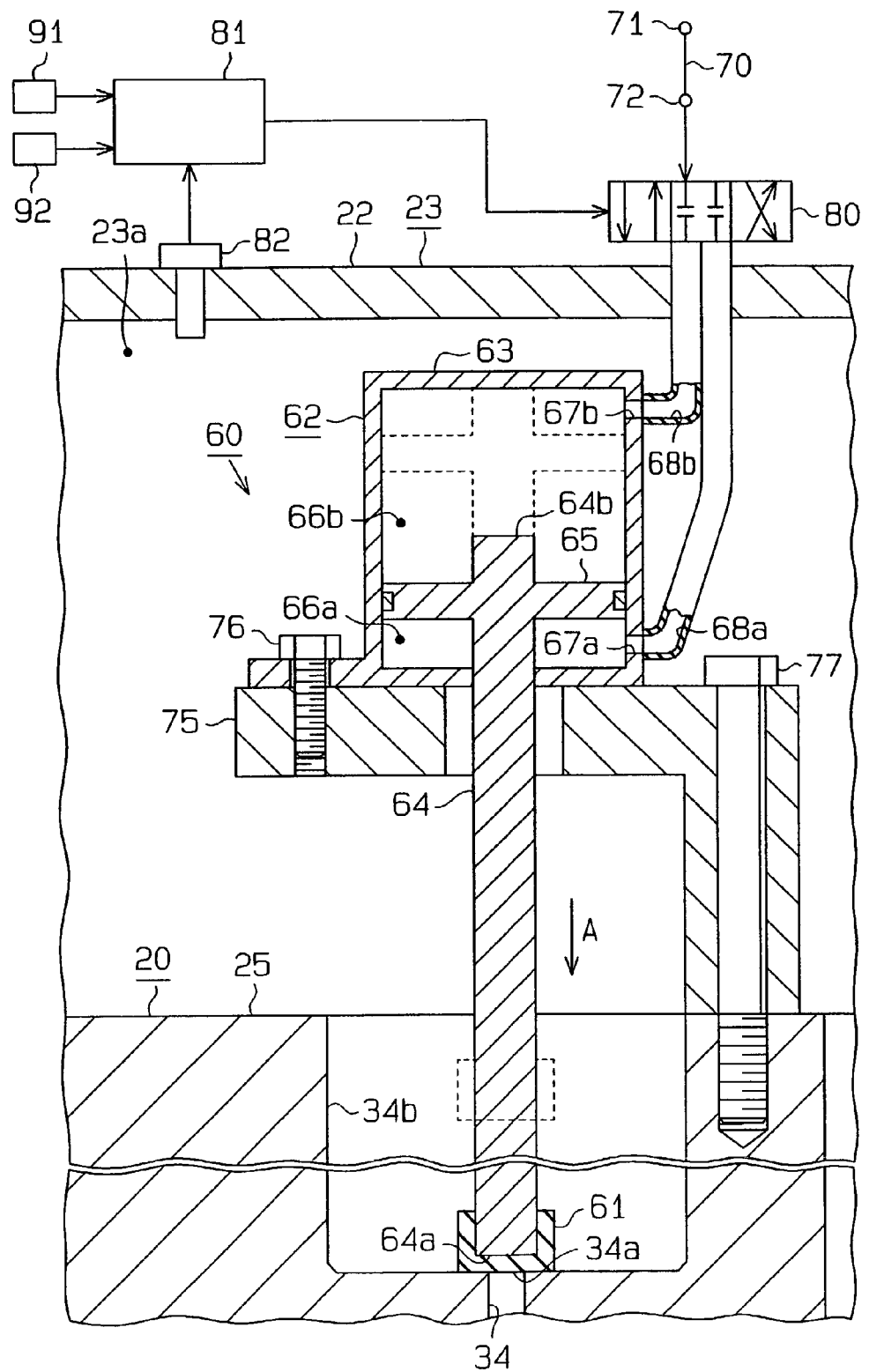
FIG. 4 is a cross-sectional view illustrating an opening-closing mechanism.

As shown in FIG. 4, each opening-closing mechanism 60 has a plug member 61 for blocking the opening 34a of the corresponding vent 34. Each opening-closing mechanism 60 includes a pneumatic cylinder 62, and a selector valve 80. The pneumatic cylinder 62 causes the plng member 61 to open and close the opening 34a. The opening-closing mechanisms 60 are connected to a common controller 81. A pressure sensor 82 is attached to the lid body 22 and is connected to the controller 81.

Each pneumatic cylinder 62 includes a cylinder body 63 and a piston 64, which is accommodated in the cylinder body 63. The piston 64 reciprocates in the cylinder body 63. The cylinder body 63 is fixed to a cylinder base 75 with bolts 76 (only one is shown in FIG. 4). The cylinder base 75 is fixed to the movable die 25 with bolts 77 (only one is shown in FIG. 4). The cylinder base 75 may be fixed to the movable die 25 in any other method. Likewise, the cylinder body 63 may be fixed to the cylinder base 75 in any other method.

Each piston 64 is formed like a rod. A lower end 64a of the piston 64 faces the corresponding vent 34. The plug member 61 is arranged at the lower end 64a. An upper end of the piston 64 is inserted into the corresponding cylinder body 63. The piston 64 has pressure receiving portion 65, which is located in the vicinity of the upper end 64b and perpendicular to the axis of the piston 64. The pressure receiving portion 65 divides the interior of the cylinder body 63 into a pressure chamber 66a closer to the piston lower end 64a and a pressure chamber 66b closer to the piston upper end 64b.

Through holes 67a and 67b are formed in each cylinder body 63. The through hole 67a corresponds to the pressure chamber 66a, and the through hole 67b corresponds to the pressure chamber 66b. An air passage 68a extends between the through hole 67a and the exterior of the box 23. The pressure chamber 66a in the cylinder body 63 is communicated with the exterior of the box 23 through the through hole 67a and the air passage 68a. An air passage 68b extends between the through hole 67b and the exterior of the box 23. The pressure chamber 66b of the cylinder body 63 is communicated with the exterior of the box 23 through the through hole 67b and the air passage 68b. The outer ends of the air passages 68a, 68b are located outside of the box 23 and connected to the selector valve 80.

Each selector valve 80 has two passages, one of which is selectively connected to one of the air passages 68a, 68b of the corresponding cylinder 62. Also, an air supply passage 70 is connected to one of the passages of each selector valve 80, and the other air passage is open to the exterior of the box 23. A pump 71 is located in each air supply passage 70. The pump 71 sends air from the exterior of the box 23 to one of the pressure chambers 66a, 66b of the corresponding cylinder body 63. A regulator 72 is located between the pump 71 and the selector valve 80. The regulator 72 regulates the air pressure applied to a pressurized passage by the pump 71 at a substantially constant level.

The controller 81 selects the state of the selector valves 80. The controller 81 switches the selector valves 80 based on output signals from sensors and switches of the molding apparatus.

A first switch 91 and a second switch 92 are connected to the controller 81. The first switch 91 outputs a signal when the first injector 40 completes injection of the coating material into the cavity 29. When receiving the signal from the first switch 91, the controller 81 switches the selector valves 80.

The controller 81 switches the selector valves 80 based on the value of a parameter that is related to the pressure in the decompression mechanism 50. In this embodiment, the parameter is an output value from the pressure sensor 82, which is attached to the box 23 to detect the internal pressure of the box 23.

The second sensor 92 outputs a signal when a predetermined period has elapsed after the first switch 91 outputs a signal. The controller 81 switches the selector valves 80 when receiving a signal from the second switch 92.

The method for molding the steering wheel 10 will now be described with reference to FIGS. 5 to 7.

First, the box 23 and the mold 20 are open as shown in FIG. 3, and mold lubricant is applied to the inner surfaces of the grooves 27, 28 of the stationary and movable dies 24, 25. The mold lubricant includes, for example, wax and silicone oil, and prevents the molded steering wheel 10 from being adhered to the mold 20, thereby facilitating the removal of the steering wheel 10.

Figure 5:
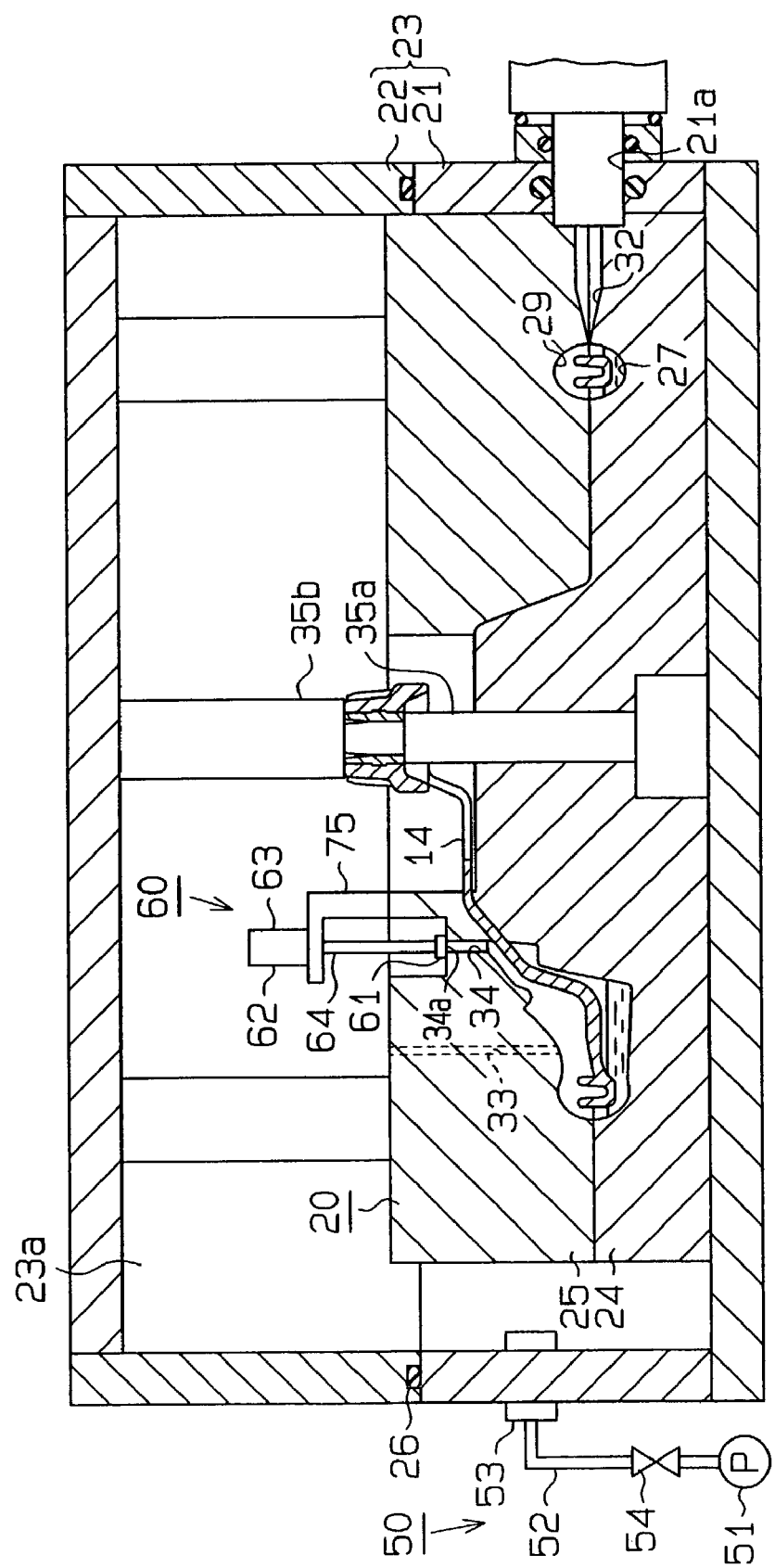
FIG. 5 is a cross-sectional view showing a process for reducing the pressure in a box.

Then, as shown in FIG. 5, the core 14 of the steering wheel 10 is set in the groove 27 of the stationary die 24. The mold 20 is closed and clamped. In this state, the frame body 21 contacts the lid body 22 to seal the interior of the box 23.

Next, the injector 40 injects a predetermined amount of the coating material into the cavity of the clamped mold 20 through the gate 32.

After the coating material is injected into the cavity 29, the controller 81 controls the opening-closing mechanisms 60 based on a signal from the first switch 91 such that each opening-closing mechanism 60 blocks the opening 34a of the corresponding vent 23 with the plug member 61. At this time, the controller 81 drives the pumps 71 and switches the selector valves 80 to supply air from the exterior of the box 23 to the pressure chamber 66b of each cylinder body 63. At the same time, the air in the pressure chamber 66a of each cylinder body 63 is discharged to the exterior of the box 23. Accordingly, each piston 64 is moved in a direction of arrow A as shown in FIG. 4. That is, the piston 64 is moved from a position shown by broken lines to a position shown by solid line, so that the plug member 61 blocks the opening 34a of the corresponding vent 34. The openings 34a of the vents 34 may be closed before or during the injection of the coating material into the cavity 29.

The controller 81 switches the selector valves 80 to maintain the openings 34a of the vents 34 blocked by the plug members 61, and drives the vacuum pump 51 of the decompression mechanism 50. The air in the box 23 is discharged to the outside through the decompression mechanism 50 and the pressure in the box 23 is lowered. The pressure in the mold 20 is maintained vacuum.

Since the cavity 29 of the mold 20 is communicated with the box 23 with the through hole 33, the air in the cavity 29 is discharged to the outside of the box 23. However, the openings 34a of the vents 34 are blocked by the opening-closing mechanism 60 and the size of the through hole 33 is small. Therefore, the rate at which the pressure in the cavity 29 is lowered is significantly less than the rate at which the pressure in the box 23 is lowered.

Figure 6:
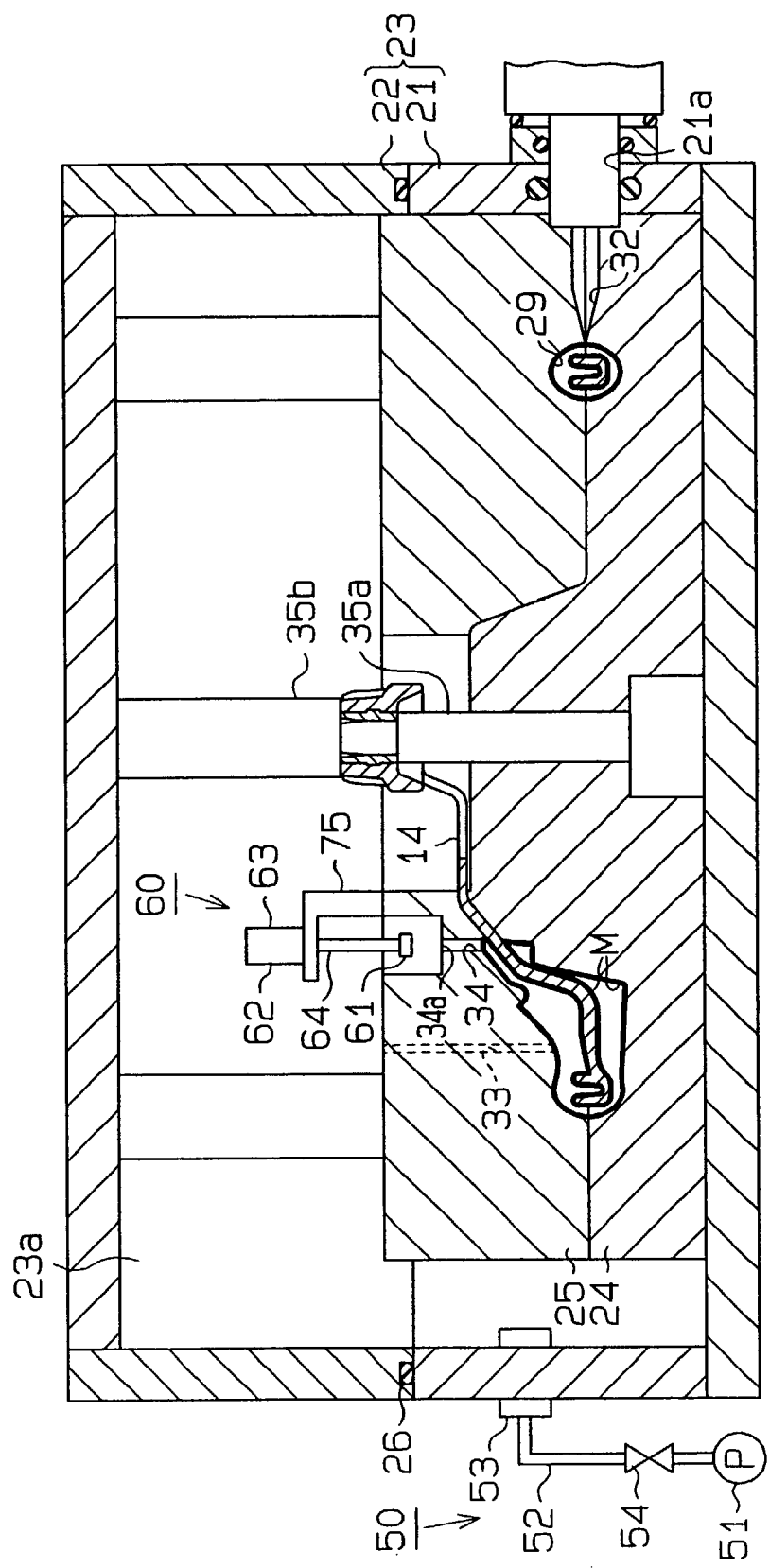
FIG. 6 is a cross-sectional view showing a decompression process.

When a predetermined period has elapsed after the decompression of the interior of the box 23 is started, the opening-closing mechanisms 60 open the openings 34a of the vents 34 as shown in FIG. 6. Accordingly, the air in the cavity 29 is discharged to the space 23a through the vents 34. This process is referred to as decompression process.

In this embodiment, the predetermined period is set to a time period in which the pressure in the decompression mechanism 50, which is represented by the output value of the pressure sensor 82, becomes a level at which the solvent in the coating material boils with the cavity 29 communicated with the decompression mechanism 50. For example, the predetermined period is set to a time period in which the pressure in the decompression mechanism becomes 200 torr. The pressure at which the solvent boils varies according to the temperature of the mold 20, the type of the solvent, and the molding conditions of the steering wheel 10.

When the opening-closing mechanisms 60 open the openings 34a of the vents 34, the controller 81 controls the selector valves 80 to supply air from the exterior of the box 23 to the pressure chamber 66a of each cylinder body 63, and to discharge air in the pressure chamber 66b of each cylinder body 63 to the exterior of the box 23. This moves each piston 64 in a direction opposite to arrow A, or from the position shown by solid lines to the position shown by broken lines. Accordingly, each plug member 61 separates from the opening 34a of the corresponding vent 34, and the opening 34a is opened.

In this manner, the opening 34a of each vent 34 is opened when the pressure in the box 23 becomes equal to the level at which the solvent in the coating material boils. Accordingly, the pressure in the cavity 29 is lowered quickly, and the solvent boils quickly. In other words, bumping of the solvent occurs. The bumping of the solvent permits the mold coating agent and colorant to be evenly applied to the inner surface of the cavity 29, and the vaporized solvent is discharged from the cavity 29 to the exterior of the box 23 through the vents 34, the interior of the box 23, and the decompression mechanism 50.

The interior of the cavity 29 is therefore dried, and a thin, even coating layer, or a mold coating agent layer M, is formed on the inner surface of the cavity 29. The mold coating agent layer M is also toned on the surface of the core 14, which is accommodated in the cavity 29. The layer M on the core 14 functions as an adhesive to adhere the base layer to the core 14. The base layer is molded with urethane in subsequent steps.

Figure 7:
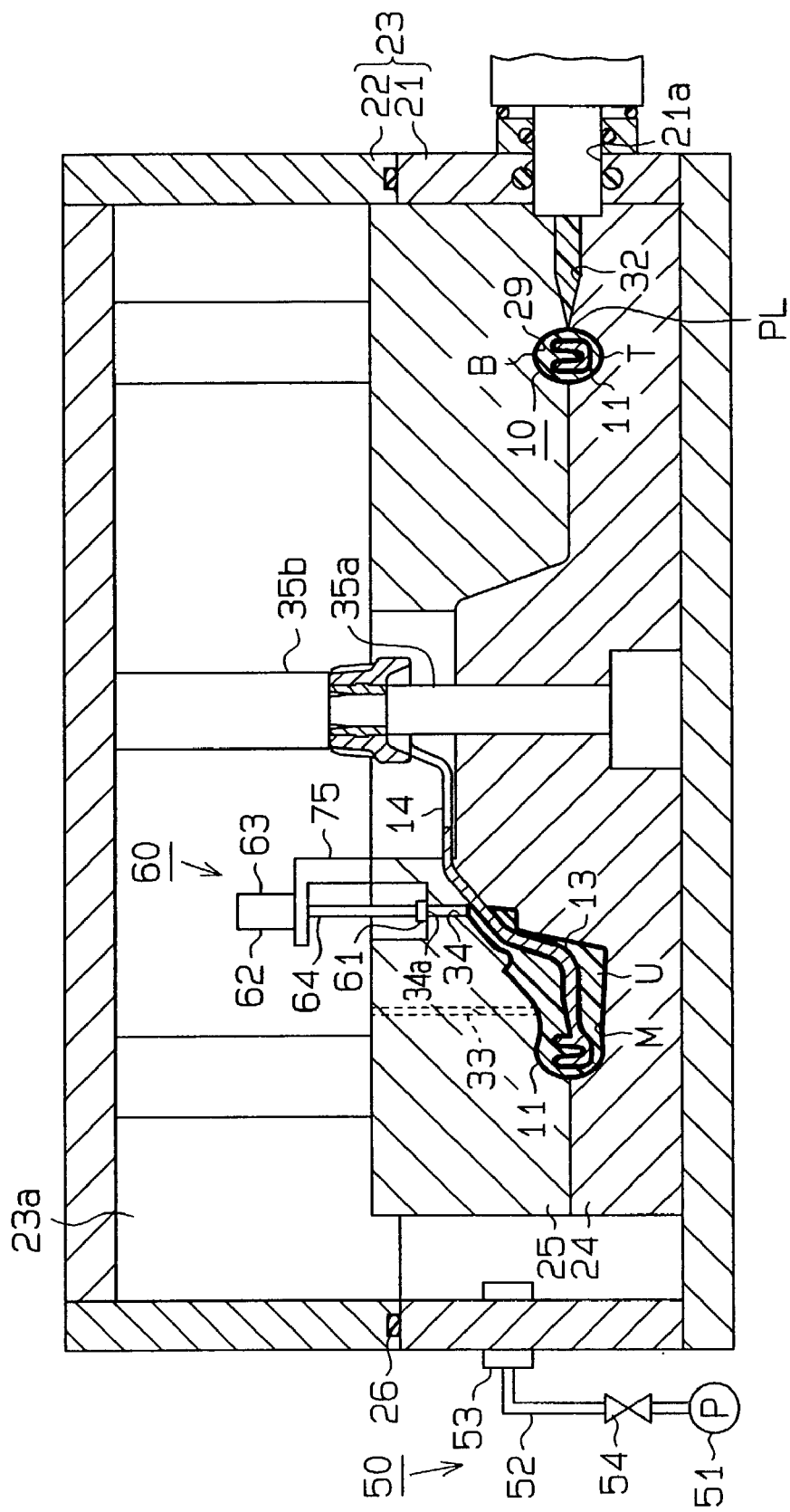
FIG. 7 is a cross-sectional view showing a molding material injection process.

After the mold coating agent layer M is formed in the cavity 29, the controller 81 controls the selector valve 80 based on an output signal of the second switch 92 to block the openings 34a of the vents 34 with the plug members 61 as shown in FIG. 7. At this time, air is supplied to and discharged from the pressure chambers 66a, 66b of the cylinder body 63 in the manner described above.

While the openings 34a of the vents 34 are blocked, the second injector 41 injects a predetermined amount of the molding material into the cavity 29 of the clamped mold 20 through the gate 32. This process is referred to as molding material injection process. In other words, a normal urethane molding is performed. At this time, the through hole 33 is kept communicated with the exterior of the mold 20, or with the space 23a in the box 23. Therefore, the molding material foams and fills the cavity 29, which is in vacuum. Accordingly, a base layer U is formed about the core 14 in the cavity 29.

Thereafter, while the openings 34a of the vents 34 are blocked by the opening-closing mechanisms 60, the box 23 is opened. Alternatively, the box 23 may be opened when the openings 34a are opened. This opens the mold 20. The steering wheel 10 is then removed. The removed steering wheel 10 has the base layer U, on which the mold coating agent layer M is formed.

This embodiment has the following advantages.

(1) In this embodiment, the opening-closing mechanisms 60 close the openings 34a of the vents 34 prior to the injection of the molding material. In other words, when the molding material is injected into the cavity 29 of the mold 20, the openings 34a are blocked by the opening-closing mechanisms 60. Thus, the molding material in the cavity 29 is prevented from entering the vents 34 and from exiting the mold 20. This eliminates the necessity of a surplus amount of the molding material and therefore reduces the costs of the steering wheel 10. The amount of scrap, or waste, is also reduced.

Since the molding material in the cavity 29 is prevented from entering the vents 34, the molding material is not hardened in the vents 34, which prevents the vents 34 from being clogged. Thus, the decompression mechanism 50 is capable of lowering the pressure in the cavity 29 in a desirable manner, which permits the coating material to be evenly applied to the inner surface of the cavity 29, and permits the applied coating material to be readily dried. This improves the quality of the finished steering wheel 10.

(2) Each opening-closing mechanism 60 includes switching means and the plug member 61. The switching means includes the pneumatic cylinder 62 and the selector valve 80. Therefore, by lowering the pressure in the box 23, the pressure in the cavity 29 of the mold 20 is easily switched between the normal pressure state and the vacuum state with a simple structure.

The switching means permits the openings 34a of the vents 34 to be readily opened and blocked. For example, if the pressure in the cavity 29 increases while the molding material is being injected into the cavity 29, the plug members 61 readily keep blocking the openings 34a of the vents 34.

(3) The controller 81 controls the selector valves 80 based on signals from the pressure sensor 82. Thus, when the pressure in the decompression mechanism 50 (the box 23) becomes a level at which the solvent in the coating material boils, the opening-closing mechanisms 60 are controlled to open the openings 34a of the vents 34. Therefore, the pressure in the cavity 29 of the mold 20 is quickly lowered, and the solvent boils quickly. That is, bumping of the solvent occurs. Therefore, the coating material is effectively scattered and evenly applied to the inner surface of the cavity 29.

(4) The steering wheel 10 is molded by the mold 20. The vents 34 are formed at positions corresponding to the three spokes 13 of the steering wheel 10. Thus, when the decompression mechanism 50 lowers the pressure in the cavity 29 of the mold 20, the pressure in the radial portions 27a, 28a of the cavity 29 is effectively lowered. Therefore, the coating layer (the mold coating agent layer M) is readily applied to the portions in the cavity inner wall that correspond to the spokes 13.

(5) The vents 34 are formed in the movable die 25 of the mold 20 and are separate from the through hole 33. During the molding material injection process, the opening-closing mechanism 60 blocks the openings 34a of the vents 34 while the through hole 33 is kept communicated with the space 23a of the box 23. Accordingly, during the molding material injection process, the air in the cavity 29 is discharged to the space 23a of the mold 20 through the through hole 33. Therefore, the current of the molding material is not hindered in the cavity 29 and molding defective of the steering wheel 10 is prevented.

(6) When the output value of the pressure sensor 82 reaches a level representing the level at which the solvent boils in the cavity 29 after the decompression process is started, the openings 34a of the vents 34 are opened. Therefore, the molding material is prevented from accidentally flowing out of the cavity 29 to the exterior of the mold 20 through the vents 34. This eliminates the necessity of injecting a surplus amount of the molding material into the cavity 29. As a result, the necessary amount of the molding material is reduced and the costs of the steering wheel 10 are reduced.

Each time the steering wheel 10 is molded, the openings 34a of the vents 34 are opened after the decompression process, and the openings 34a are closed prior to the molding material injection process. This reduces the necessary amount of the molding material and the coating material. As a result the costs of the steering wheel 10 are further reduced.

The example of the procedure according to the illustrated embodiment and a comparison example will now be described with reference to timing charts of FIGS. 8 and 9.

Figure 8:
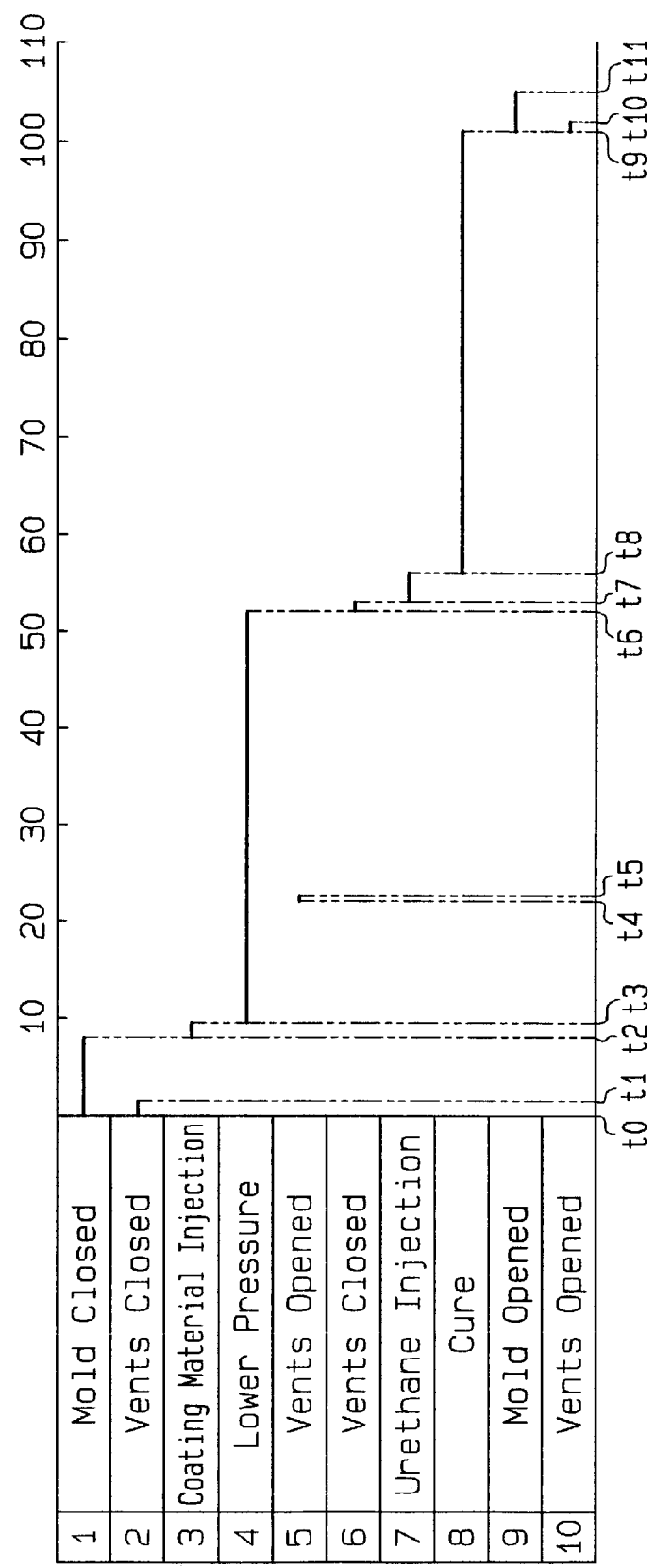
FIG. 8 is a timing chart showing an example of the molding method according to the embodiment of FIGS. 1 to 7.

In the example of the illustrated embodiment, prior to decompression of the interior of the box 23, the cavity 29 of the mold 20 was closed and the vents 34 were blocked in a period from time t0 to time t2 and in a period from time t0 to time t1 of FIG. 8. In this state, 100 g of the mold coating of the coating material was injected into the cavity 29 in a period from t2 to t3 of FIG. 8.

Then, decompression of the pressure in the box 23 was started. When the pressure in the box 23 falls to 200 torr, the vents 34 were opened (period from time t4 to time t5). Thereafter, the inner pressure of the box 23 was further lowered. When the pressure fell to 10 torr (time t6), the vents 34 were closed again (period from time t6 to t7). Then, during the period from time t7 to time t8, the molding material, or urethane, was injected into the cavity 29.

The molding material was cured during the period from time t8 to time t9. In the period from time t9 to time t11, the mold 20 was opened and the vents 34 are opened. Then, the finished article, or the steering wheel 10, was removed from the mold 20 and test. The test confirmed that a mold coating layer of an even thickness of 6 to 8 micrometers had been formed on the entire gripping portion of the steering wheel.

The thickness of the coating layer was measured at six points on three angular sections. That is, the thickness was measured at six points on the outer parting line PL, at six points on the top section T, which is spaced from the parting line PL substantially by ninety degrees clockwise as viewed in FIG. 7, and at six points on the bottom section B, which is spaced from the parting line PL substantially by ninety degrees counterclockwise as viewed in FIG. 7. The six measuring points in each section are equally spaced in an arcuate portion CA (see FIG. 1). The arcuate portion CA is defined between two of the spokes that extend leftward and rightward from the center when the steering wheel is at a position where the vehicle is traveling in the straight line.

TABLE 1

Thickness of the mold coating layer
(example of the illustrated embodiment)

| Measuring point No. | Top Section T | PL | Bottom Section B |
| --- | --- | --- | --- |
| 1 | 7.84 | 8.82 | 6.37 |
| 2 | 7.84 | 7.35 | 4.90 |
| 3 | 8.33 | 5.88 | 5.88 |
| 4 | 7.84 | 7.84 | 7.35 |
| 5 | 6.86 | 9.31 | 6.86 |
| 6 | 7.35 | 7.35 | 7.35 |
| Average | 7.68 | 7.76 | 6.45 |

The comparison example will now be described.

In the comparison example, a mold coating layer was formed in the same manner as the illustrated embodiment except for that the vents 34 were open from the beginning of the procedure. As a result, the mold coating layer was not formed on the bottom section B of the gripping portion.

TABLE 2

Thickness of the mold coating layer (comparison example)

| Measuring point No. | Top Section T | PL | Bottom Section B |
| --- | --- | --- | --- |
| 1 | 7.35 | 11.27 | 0.00 |
| 2 | 8.82 | 11.27 | 0.00 |
| 3 | 5.39 | 11.76 | 0.00 |
| 4 | 6.37 | 7.84 | 0.00 |
| 5 | 8.33 | 11.76 | 0.00 |
| 6 | 6.86 | 12.74 | 0.00 |
| Average | 7.19 | 11.11 | 0.00 |

In the comparison example, the amount of the mold coating in the coating material to be injected into the cavity 29 is increased from 100 g of the example of the illustrated embodiment to 120 g, and the mold coating layer was formed in the same manner as the illustrated embodiment. The vents 34 were open from the beginning of the procedure. In this case, mold coating layer of eight micrometers was formed on the top section of the gripping portion, and mold coating layer of six micrometers was formed on the bottom section of the gripping portion.

In the comparison example, the vents were opened while the pressure in the cavity was lowered. Thus, the mold coating did not cover the entire portion to be coated. However, in the example of the illustrated embodiment, the pressure in the cavity 29 was lowered with the vents blocked, the mold coating formed on the entire portion to be coated. As a result, even if the amount of the mold coating was reduced from 120 g to 100 g, the mold coating layer having a required thickness was formed.

As obvious from the example of the illustrated embodiment and the comparison example, forming the vents 34 and controlling the state of the vents 34 permitted the amount of the coating material to be reduced by about 20%. Accordingly, the costs of the steering wheel 10 are reduced.

It should be apparent to those skilled in the art that the present invention may be embodied in many other specific forms without departing from the spirit or scope of the invention. Particularly, it should be understood that the invention may be embodied in the following forms.

In the illustrated embodiment, the procedure for molding the steering wheel 10, which has the three spokes 13, is described. However, the number of the spokes 13 may be changed to one, two, four or more.

In the illustrated embodiment, the vents 34 are formed in the movable die 25 to correspond to the spokes 13 of the steering wheel 10. However, the vents 34 need not correspond to all the spokes 13 of the steering wheel 10. The vents 34 may be formed in the movable die 25 to correspond to some of the spokes 13.

The vents 34 need not correspond only to the spokes 13. For example, the vents 34 may be formed to correspond to the ring portion 11, or to both of the ring portion 11 and the spokes 13.

The number and the arrangement of the vents 34 in the mold 20 may be varied according to the shape and the size of the cavity 29. For example, only one vent 34 may be formed in the mold 20. Alternatively, the vents 34 may be formed in the stationary die 24.

In the illustrated embodiment, the mold 20 is formed such that the parting surfaces are horizontal as shown in FIGS. 3, 5, 6, and 7. However, the mold 20 may be arranged such that the parting surfaces are substantially vertical.

In the embodiment, the recesses 34b of the movable die 25 may be omitted.

In the illustrated embodiment, the opening-closing mechanisms 60 correspond to each of the vents 34 of the mold 20. However, when the mold 20 has two or more of the vents 34, some of the vents 34 may be opened and closed by a common one of the opening-closing mechanisms 60.

In the illustrated embodiment, the surface of the plug member 61 of each opening-closing mechanism 60 that contacts the movable die 25 is flat as shown in FIG. 4. However, the surface need not be flat. Each plug member 61 may have a projection that protrudes toward the movable die 25 and fitted into the corresponding vent 34 through the opening 34a.

In the illustrated embodiment, the pressure sensor 82 is attached to the lid body 22. However, the pressure sensor 82 may be attached, for example, to the pipe 52 or the discharge pipe 53 of the decompression mechanism 50.

In the illustrated embodiment, output values of the pressure sensor 82 are used as the parameter representing the pressure in the decompression mechanism 50. However, the parameter is not limited to the output values of the pressure sensor 82. For example, the time period elapsed after the mold 20 is clamped may be used as the parameter. In this case, a timer for measuring the elapsed time period is used.

Instead of the pressure sensors 82, a third switch, which outputs a signal when the pressure in the decompression mechanism 50 reaches a predetermined level, may be used. When the controller 81 receives an output signal from the third switch, the openings 34a of the vents 34 are opened. In this case, the second switch is replaced with a fourth switch, which outputs a signal when a predetermined period has elapsed after the third switch outputs a signal. When the controller 81 receives a signal form the fourth switch, the openings 34a of the vents 34 are closed.

In the illustrated embodiment, the controller 81 is connected to the opening-closing mechanisms 60. However, the controller 81 may be omitted. In this case, the opening-closing mechanisms 60 are controlled by an operator of the steering wheel molding apparatus.

In the illustrated embodiment, each opening-closing mechanism 60 has a pneumatic cylinder 62, which uses air as working fluid. However, the working fluid is not limited to air. The opening-closing mechanisms 60 may have hydropneumatic cylinders that use gas other than air, water, or lubricant oil as the working fluid.

Instead of the hydropneumatic cylinders, electric motors, diaphragm valves, or electromagnetic valves may be used. When electric motors are used, a plug having a threaded circumference may be attached to each motor, and each vent 34 may be threaded. In this case, each plug is threaded with the corresponding vent 34. When electric motors or electromagnetic valves are used, the selector valves 80 are omitted.

In the illustrated embodiment, the first injector 40 may be omitted. In this case, the coating material is poured into the opened groove 27 of the stationary die 24 with a measuring cup. The mold 20 is preferably arranged to make the parting surfaces horizontal so that the coating material does not flow out of the groove 27.

In the illustrated embodiment, the coating material includes the mold coating agent, the colorant, methyl ethyl ketone, and isopropyl alcohol. However, the components of the coating material may be changed. For example, a component other than polyurethane may be used as the mold coating agent. In addition to the methyl ethyl ketone and the isopropyl alcohol, toluene may be added to the solvent. Alternatively, water may be used as the solvent. The coating material need not contain colorant. Further, the coating material may contain mold lubricant.

In the illustrated embodiment, the molding material includes the polyol component and isocyante component. However, the components of the molding material may be changed. For example, resin other than polyurethane or rubber may be contained in the molding material. The molding material may include a foaming agent.

In the illustrated embodiment, the coating material is injected into the cavity 29 after the mold 20 is clamped. However, the injection of the coating material may be started while the mold 20 is still open. In this case, the mold 20 is preferably arranged to make the parting surfaces horizontal so that the coating material does not flow out of the groove 27.

In the illustrated embodiment, the openings 34a of the vents 34 are opened when the pressure in the space 23a of the box 23 becomes a level at which the solvent in the coating material in the cavity 29 boils. However, the openings 34a may be opened at any timing other than the above timing. The openings 34a of the vents 34 may be opened immediately before or when a certain time has elapsed after the pressure in the space 23a of the box 23 becomes a level at which the solvent in the coating material in the cavity 29 boils. In this case, bumping of the solvent in the coating material in the cavity 29 occurs when the openings 34a are opened, and the mold coating agent layer M is readily formed on the inner surface of the cavity 29. Also, the coating material in the cavity 29 is prevented from flowing out of the mold 20 through the vents 34.

The openings 34a may be opened before the pressure in the space 23a of the box 23 becomes reaches the level at which the solvent in the coating material in the cavity 29 boils. This reduces the amount of the coating material that flows out of the mold 20 through the vents 34.

In the illustrated embodiment, the openings 34a of the vents 34 are closed before the injection of the molding material. However, after the mold coating agent layer M is formed, the openings 34a may be closed at any timing other than the above timing. The openings 34a may be closed during the injection of the molding material. In this case, the openings 34a are closed before the molding material injected into the cavity 29 reaches any of the vents 34. This facilitates air existing at a part of the cavity 29 that corresponds to the spokes 13 to be discharged to the exterior of the mold 20 through the proximate vents 34. Accordingly, the filling factor of the molding material in the cavity 29 is increased.

The openings 34a need not be closed simultaneously. For example, the openings 34a may be consecutively closed from the one corresponding to a vent 34 located in a part that is first filled by the molding material. In this manner, some of the vents 34 may function as through holes.

In the illustrated embodiment, the openings 34a of the vents 34 are opened when a predetermined period has elapsed after the decompression process is started, and the openings 34a are closed before the injection of the molding material. One of these processes may be omitted.

In the illustrated embodiment, the apparatus and the method for molding the steering wheel 10 are described. However, the present invention may be applied to apparatuses and methods for molding other vehicle parts, for example, instrument panels, console boxes, glove boxes, headrests, armrests, door covers, air spoilers, and bumpers. The present invention may also be applied to apparatuses and methods for molding articles other than vehicle parts. For example, the present invention may be applied to apparatuses and methods for molding home electric appliances.

Therefore, the present examples and embodiments are to be considered as illustrative and not restrictive and the invention is not to be limited to the details given herein, but may be modified within the scope and equivalence of the appended claims.

What is claimed is:

1. An apparatus for molding an article, comprising:
  a mold, wherein, when the mold is clamped, a cavity is defined in the mold, and wherein the mold has at least one vent communicated with the cavity;

an injecting mechanism for injecting coating material and molding material into the cavity;

a decompression mechanism, wherein, after the coating material is injected into the cavity, the decompression mechanism lowers the pressure in the cavity through the vent, thereby forming a predetermined coating on the inner surface of the cavity;

an opening-closing mechanism for opening and closing the opening of the vent, wherein the opening-closing mechanism includes switching means and a plug member for blocking the vent, wherein the switching means switches the vent between an open state and a closed state with the plug member; and a controller for controlling the switching means, wherein the controller controls the switching means based on the value of a parameter that represents the pressure in the decompression mechanism.

2. The apparatus according to claim 1, wherein the switching means is a hydropneumatic cylinder.

3. The apparatus according to claim 1, wherein the article is a steering wheel, and wherein the vent is one of a plurality of vents, the vents being located at positions corresponding to a plurality of spokes of the steering wheel.

4. An apparatus for molding an article, comprising:

a first injection mechanism, wherein the first injection mechanism injects coating material into a cavity defined in a clamped mold, thereby forming a predetermined coating on the inner surface of the cavity;

a decompression mechanism, wherein, after the coating material is injected into the cavity, the decompression mechanism lowers the pressure in the cavity through at least one vent;

a second injection mechanism, wherein, after the coating is formed on the inner surface of the cavity, the second injection mechanism injects molding material into the cavity; and an opening-closing mechanism for opening and closing vent, wherein the opening-closing mechanism includes a plug member for blocking the vent and switching means, the switching means switches the vent between the open state and the closed state with the plug member, and wherein the opening-closing mechanism opens the vent when the pressure in the cavity is being lowered and closes the vent before or during the injection of the molding material; and a controller for controlling the switching means, wherein the controller controls the switching means based on the value of a parameter that represents the pressure in the decompression mechanism.

5. The apparatus according to claim 4, wherein the switching means is a hydropneumatic cylinder.

6. The apparatus according to claim 4, wherein the article is a steering wheel, and wherein the vent is one of a plurality of vents, the vents being located at positions corresponding to a plurality of spokes of the steering wheel.

7. An apparatus for molding an article, comprising:

a mold, wherein, when the mold is clamped, a cavity is defined in the mold, and wherein the mold has at least one vent communicated with the cavity;

an injecting mechanism for injecting coating material and molding material into the cavity;

a decompression mechanism, wherein, after the coating material is injected into the cavity, the decompression mechanism lowers the pressure in the cavity through the vent, thereby forming a predetermined coating on the inner surface of the cavity;

an opening-closing mechanism for opening and closing the opening of the vent, wherein the opening-closing mechanism switches the vent between an open state and a closed state; and a controller for controlling the opening-closing mechanism, wherein the controller controls the opening-closing mechanism based on the value of a parameter that represents the pressure in the decompression mechanism.

8. The apparatus according to claim 7, wherein the switching means is a hydropneumatic cylinder.

9. The apparatus according to claim 7, wherein the article is a steering wheel, and wherein the vent is one of a plurality of vents, the vents being located at positions corresponding to a plurality of spokes of the steering wheel.

* * * * *